(12) United States Patent
Rosadini et al.

(10) Patent No.: US 12,052,275 B2
(45) Date of Patent: Jul. 30, 2024

(54) METHOD FOR PROTECTION FROM CYBER ATTACKS TO A VEHICLE, AND CORRESPONDING DEVICE

(71) Applicant: Marelli Europe S.p.A., Corbetta (IT)

(72) Inventors: Christian Rosadini, Corbetta (IT); Anastasia Cornelio, Corbetta (IT); Walter Nesci, Corbetta (IT); Sergio Saponara, Pisa (IT); Alessio Gagliardi, Catanzaro (IT); Paola De Cesare, Pisa (IT)

(73) Assignee: Marelli Europe S.p.A., Corbetta (IT)

( * ) Notice: Subject to any disclaimer, the term of this patent is extended or adjusted under 35 U.S.C. 154(b) by 247 days.

(21) Appl. No.: 17/804,010

(22) Filed: May 25, 2022

(65) Prior Publication Data

US 2022/0407880 A1      Dec. 22, 2022

(30) Foreign Application Priority Data

May 26, 2021   (IT) .......................... 102021000013754

(51) Int. Cl.
*H04L 29/06*      (2006.01)
*H04L 9/40*       (2022.01)

(52) U.S. Cl.
CPC ................. *H04L 63/1425* (2013.01)

(58) Field of Classification Search
CPC ................ H04L 63/1425; H04L 12/12; H04L 2012/40215; H04L 2012/40273;
(Continued)

(56) References Cited

U.S. PATENT DOCUMENTS 10,124,764 B1*  11/2018 Ahmed ................. B60R 16/023
2017/0126711 A1*  5/2017 Jung ....................... G05B 15/02
(Continued)

FOREIGN PATENT DOCUMENTS

WO       2020021525 A1      1/2020

OTHER PUBLICATIONS

Cho, Kyong-Tak, and Kang G. Shin. "Viden: Attacker identification on in-vehicle networks." Proceedings of the 2017 ACM SIGSAC Conference on Computer and Communications Security. 2017. (Year: 2017).*

(Continued)

*Primary Examiner* — Ka Shan Choy
(74) *Attorney, Agent, or Firm* — Howard & Howard Attorneys PLLC (57) ABSTRACT

A method for protection from cyber attacks in a communication network of a vehicle comprising: the steps of building sets of dominant voltage measurements for each message identifier associated to a message that is passing; extracting statistical features; supplying the statistical features for each message identifier that are available at each instant at input to a neural network of a pattern-recognition type; carrying out an operation of classification, or pattern recognition, supplying a prediction of a membership class corresponding to a given node on the basis of the statistical features supplied at input; evaluating whether the prediction supplied by the neural network corresponds to a given node that allows as admissible message identifier the message identifier at input and, if it does not, signalling an anomaly for the message identifier; and evaluating whether a number of anomalies signalled for said message identifier exceeds a given threshold.

11 Claims, 7 Drawing Sheets

(58) Field of Classification Search
CPC ........... H04L 12/40006; H04L 63/1466; H04L 63/1416; H04L 12/40
See application file for complete search history.

(56) References Cited

U.S. PATENT DOCUMENTS

| | | |
|---|---|---|
| 2018/0091550 A1 | 3/2018 | Cho et al. |
| 2019/0028500 A1 | 1/2019 | Lee et al. |
| 2019/0260772 A1* | 8/2019 | Juliato ................ H04L 63/1416 |
| 2021/0173961 A1* | 6/2021 | Young .................... H04L 63/12 |
| 2022/0294638 A1* | 9/2022 | Quigley ................. H04L 12/40 |

OTHER PUBLICATIONS

Search Report for Italian Patent Application No. 202100013754 dated Feb. 1, 2022.

Al-Jarrah, Omar Y. et al., "Intrusion Detection Systems for Intra-Vehicle Networks: A Review," IEEE Access, vol. 7, pp. 21266-21289 (Feb. 14, 2019).

Cho, Kyong-Tak et al., "Viden: Attacker Identification on In-Vehicle Networks," Arxiv.org, Cornell University Library, pp. 1-35 (Aug. 28, 2017).

Choi, Wonsuk et al., "VoltageIDS: Low-Level Communication Characteristics for Automotive Intrusion Detection System," IEEE Transactions on Information Forensics and Security, vol. 13, No. 8, pp. 2114-2129 (Mar. 5, 2018).

\* cited by examiner

METHOD FOR PROTECTION FROM CYBER ATTACKS TO A VEHICLE, AND CORRESPONDING DEVICE

CROSS-REFERENCE TO RELATED APPLICATIONS

The present application claims priority to and all the benefits of Italian Patent Application No. 102021000013754, filed on May 26, 2021, which is hereby expressly incorporated herein by reference in its entirety.

BACKGROUND OF THE INVENTION

1. Field of the Invention

The present invention relates to techniques for protection from cyber attacks in a communication network, in particular a CAN (Controller Area Network), of a vehicle, that comprises a bus, in particular a CAN-bus, and a plurality of nodes associated to said bus in a signal-exchange relationship and associated at least in part to control units for controlling functions of the vehicle.

2. Description of the Related Art

The CAN-bus, adopted as communication bus in motor vehicles, is a communication device of a serial and multi-master type, in which each master, also referred to as node, connected to the bus is able to send, receive, and solve the conflicts of simultaneous access for transmission by a number of nodes.

Figure 1:
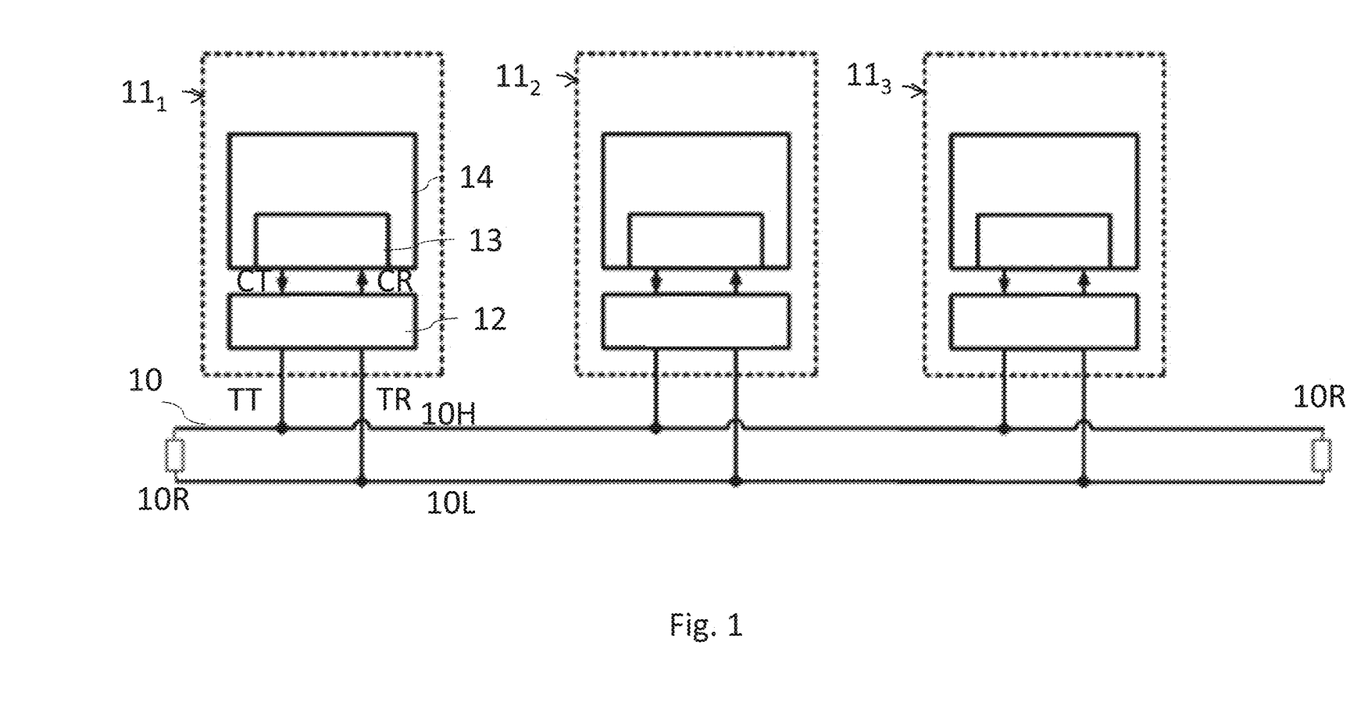

Schematically illustrated in FIG. 1 is a CAN-bus 10, comprising a plurality of nodes 11. Indicated in FIG. 1 are three nodes $11_1, \ldots, 11_3$. A node 11, which is able to communicate on a CAN-bus 10, in general comprises, as shown in FIG. 1:
- a CAN transceiver 12, which is associated, through a transmission line TT and a reception line TR, to the CAN-bus 10 and is configured for managing the electrical levels proper to the CAN-bus (physical layer of the OSI model);
- a CAN controller 13, which is connected, through a transmission line CT and a reception line CR, to the CAN transceiver 12, and is configured for managing the logic levels and the serialization of the CAN-bus 10 (data-link layer of the OSI model);
- a microcontroller 14, which contains the logic of transmission and reception of the messages (management of the OSI layers higher than the data-link layer).

The bus 10 comprises two lines. Denoted by 10H is the high line of the CAN-bus 10, or CAN-high, while denoted by 10L is the low line, or CAN-low. At the two ends of the bus 10 the two lines 10H and 10L are terminated by termination resistances 10R. In FIG. 1, the transmission lines TT are coupled to the high line 10H, whereas the reception lines TR are coupled to the low line 10L.

Hence, the CAN-bus 10 is a differential bus and therefore has a structure with two lines, referred to as "CAN-high" 10H and "CAN-low" 10L.

The methods of identification of malicious messages in a CAN-bus that connects a plurality of nodes, for example electronic control units (ECUs), aim at determining what message is malicious, but above all from what node or ECU it comes, so as to be able to track the source itself of the attack and take the necessary measures. In particular, after the identification of the attacker, e.g., the malicious node, tracking thus the source itself of the attack, corresponding protection measures are taken. In particular such measures may include one or more of forensic, isolation, security patch.

The intrusion-detection systems currently implemented on vehicles manage to determine the presence of a cyber attack, but are not equipped with an attacker-recognition system.

Provided in Table 1 is the structure of a message according to the CAN protocol; in particular, the message of a data type is structured with sections S of contiguous bits, as listed below.

TABLE 1

| Section S [size in bits] | Content of section S |
|---|---|
| S1 | SOF [1 bit] | start of CAN message |
| S2 | Arbitration Field [12/32 bits] | contains message identifier |
| S3 | Control Field [6 bits] | contains the information of the length of the data transmitted |
| S4 | Data Field [0-64 bits] | data section (information content of the message) |
| S5 | CRC Field [16 bits] | integrity-check code (with delimiter field) |
| S6 | ACK Field [2 bits] | to confirm proper reception by the other nodes (with delimiter field) |
| S7 | EoF [7 bits] | area of recessive bits necessary for signalling end-of-message |
| S8 | ITM [3 bits] | intermission area, i.e., area of recessive bits that functions as separator between messages |

The fields of interest of the message are mainly the arbitration field S1 and the ACK (Acknowledge) field S6. The arbitration field is constituted by the message ID (Identifier), which determines the priority thereof and identifies the message. The smaller the binary value, the higher the priority. The ACK bit, which is originally recessive (and hence at 1), is overwritten with a dominant bit by the ECUs or nodes 11 that correctly receive the message. In this way, each node acknowledges the integrity of the message.

The CAN protocol is a multi-master protocol. This means that each network node can write on the bus whenever it is free. If a number of nodes wish to communicate at the same moment, the message with the highest priority wins and writes. The conflicts are solved with a bit-by-bit arbitration of the ID field. The CAN specifies two logic states: "dominant" and "recessive", where dominant is the logic 0 and recessive the logic 1. If one ECU transmits a dominant bit and another one transmits a recessive bit, then there is a collision and the one that has transmitted the dominant bit wins. At this point, the other node loses arbitration and queues up for retransmission. In this way, the messages with high priority do not wait to be transmitted, and the messages with low priority attempt to write again on the bus after sending of the dominant message. This is what renders the CAN suitable as priority real-time communication system.

Figure 2A:
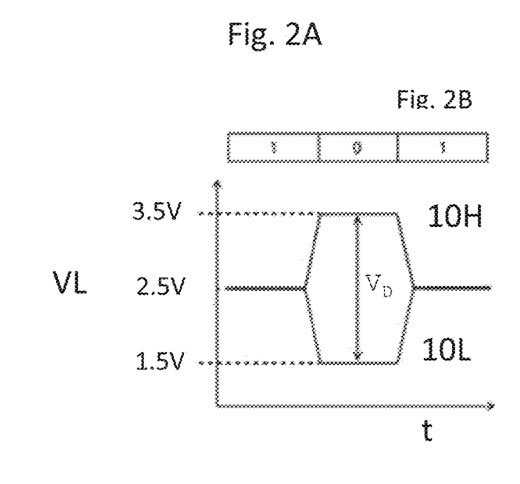

Illustrated in FIG. 2A is a diagram that shows the physical voltage levels VL on the CAN-bus 10 as a function of time t.

As illustrated in FIG. 1, each node 11 comprises a microcontroller 14 with a CAN controller 13, responsible for correct writing and reading of the messages on the bus 10 shared between the ECUs or nodes 11. It carries out bit stuffing, a procedure that consists in insertion of a bit having an opposite value after five consecutive bits of the same value, and of the checksum, and, after sending a message, waits for acknowledgement from the receivers. The CAN transceiver 12 converts the data stream from the voltage levels of the CAN-bus 10 to the levels that the CAN controller 13 uses, and vice versa.

The CAN-bus 10 is a differential bus, and therefore has a structure with two lines, as illustrated in FIG. 1, CAN-high 10H and CAN-low 10L. When a 0 bit is to be sent, the CAN transceivers 12 produce a voltage level of approximately 3.5 V on the CAN-high line 10H and 1.5 V on the CAN-low line 10L so that the potential difference $V_D$ between the two lines will be approximately 2 V. This 0 bit is referred to as "dominant". Likewise, when a 1 bit is to be transmitted, the output of the transceivers 12 is approximately 2.5 V both on the CAN-high line 10H and on the CAN-low line 10L, thus producing a potential difference $V_D$ of 0 V. The corresponding bit, in this case, is referred to as "recessive".

Figure 2B:
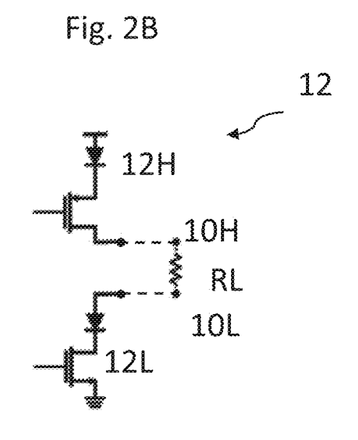

FIG. 2B illustrates schematically a transceiver 12, which comprises a MOS transistor 12H that operates as switch between the supply voltage VCC and the CAN-high line 10H and a MOS transistor 12L that operates as switch between the CAN-low line 10L and ground GND. To do this, the CAN transceivers 12 must switch on/switch off simultaneously the transistors 10H, 10L of which they are made up. When a dominant bit is transmitted, the MOS transistors 12H, 12L are switched on; when a recessive bit is transmitted, they are switched off and set in a high-impedance state.

Described hereinafter are some typical scenarios of attack.

One type of attack is referred to as "fabrication attack". Through an in-vehicle ECU compromised in such a way as to be a strong attacker, the adversary fabricates and injects messages with forged ID (Identifier), DLC (Data-Length Code), and data. The objective of this attack is to override any periodic messages sent by legitimate safety-critical ECUs, so that their receiver ECUs get distracted or become inoperable. For instance, the attacker injects various malicious messages with a given ID, for example 0xB0, which is usually sent by a legitimate ECU, at a high frequency. Thus, other nodes that normally receive the message 0xB0 are forced to receive the fabricated attack messages more frequently than the legitimate ones. In such a case, the attacker ECU is carrying out a fabrication attack on the message 0xB0 and on its original transmitter, the legitimate ECU.

Another type of attack is referred to as "suspension attack". To carry out a suspension attack, the attacker needs just one weakly compromised ECU. As in the case of Denial-of-Service (DoS) attacks, the objective of this attack is to stop/suspend transmission by the weakly compromised ECU, thus preventing delivery/propagation of information that is acquired by other ECUs on the CAN, the reason for this being that some ECUs must receive specific information from other ECUs for their proper operation. Consequently, the suspension attack can damage not only the weakly compromised ECU, but also other receiver ECUs.

Another type of attack is referred to as "masquerade attack". To mount a masquerade attack, the attacker needs to compromise two ECUs, one as a strong attacker and the other as a weak attacker. The objective of this attack is to manipulate an ECU while masking the condition of the ECU being compromised. Up to a given masquerade instant, the adversary monitors and learns which messages are sent and at what frequency by its weaker attacker; for example, the weak attacker sends the message 0xB0 every 20 ms. Since most network messages are periodic and broadcast, for example, over CAN, it is easy to learn their identifiers (IDs) and the transmission intervals. Once the adversary has learnt the ID and the frequency of a message, at the masquerade instant the adversary stops transmission of its weak attacker and utilizes its strong attacker to fabricate and inject attack messages with ID=0xB0. Stopping transmission of the weak attacker and exploiting the strong attacker for transmission of malicious messages has the purpose of overcoming the inability of the weak attacker to inject messages. After the masquerade instant, the original transmitter of 0xB0, i.e., the weak attacker, does not send that message, whereas the strong attacker sends it, instead, at its original frequency. So, when the traffic of the bus, for example, the CAN bus, is observed, the frequency of the message 0xB0 remains the same, whereas its transmitter has changed.

From the above examples, it is evident how important it is to manage to discriminate from which ECU the attack really comes, especially in the case of a masquerade attack.

The patent application US 2019/0028500 describes a machine-learning technique for detecting possible attacks that can be performed within a motor vehicle. Given that the attack can come from an external device or from an internal ECU, implementation of two neural networks is proposed based upon an SVM (Support Vector Machine) approach to distinguish the dual nature of the attack.

This approach requires two neural networks with a complex architecture and implies computational complexity in the extraction of the features, which renders problematical implementation on embedded automotive platforms.

SUMMARY OF THE INVENTION

The object of the present invention is to provide a monitoring method that will make it possible to recognize autonomously the presence of an attack and identifying from which node a malicious message is coming.

According to the present invention, the above object is achieved thanks to a protection method, as well as to a corresponding protection device. More specifically, the present invention is directed toward a method for protecting against cyber attacks in a communication network, in particular a CAN (Controller Area Network), of a vehicle, that comprises a bus, in particular a CAN-bus, comprising a high bus line, on which high logic voltages pass, and a low bus line, on which low logic voltages pass, and a plurality of nodes associated to the bus in a signal-exchange relationship and associated at least in part to control units for controlling functions of the vehicle. The nodes exchange messages passing between nodes of the plurality of nodes to identify illicit messages. The messages are coded in data frames through dominant and recessive bits. The method includes the steps of: building sets of dominant voltage measurements for each message identifier associated to a message that is passing; extracting statistical features, in particular features accumulated in respective sets of dominant voltage measurements for each message identifier; supplying the statistical features for each message identifier that are available at each instant at input to a neural network of a pattern-recognition type; carrying out an operation of classification, or pattern recognition, supplying a prediction of a membership class corresponding to a given node on the basis of at least the statistical features supplied at input; carrying out an anomaly-detection operation that comprises evaluating whether the prediction supplied by the neural network corresponds to a given node that allows as admissible message identifier the message identifier at input and, if it does not, signalling an anomaly for the message identifier; and carrying out an operation for recognition of attacks, which comprises evaluating whether a number of anomalies signalled for the message identifier exceeds a given threshold.

In addition, the present invention is also directed toward a device for protecting against cyber attacks in a communication CAN (Controller Area Network) of a vehicle comprising a CAN-bus and a plurality of nodes associated to the CAN-bus in a signal-exchange relationship and associated at least in part to control units for controlling functions of the vehicle. The device is configured for operating according to the method described above.

Other objects, features and advantages of the present invention will be readily appreciated as the same becomes better understood after reading the subsequent description taken in connection with the accompanying drawings.

BRIEF DESCRIPTION OF THE DRAWINGS

The invention will be described with reference to the annexed drawings, which are provided purely by way of non-limiting example and in which:

FIGS. 1, 2A, and 2B have already been described previously;

DETAILED DESCRIPTION OF THE INVENTION

According to the solution described herein, it is envisaged to work with the physical information of the messages. Starting from the voltage levels of CAN-high and CAN-low, some features are calculated, which represent the input dataset for a neural network. The prediction of the neural network is then supplied to an anomaly-detection procedure.

Figure 3:
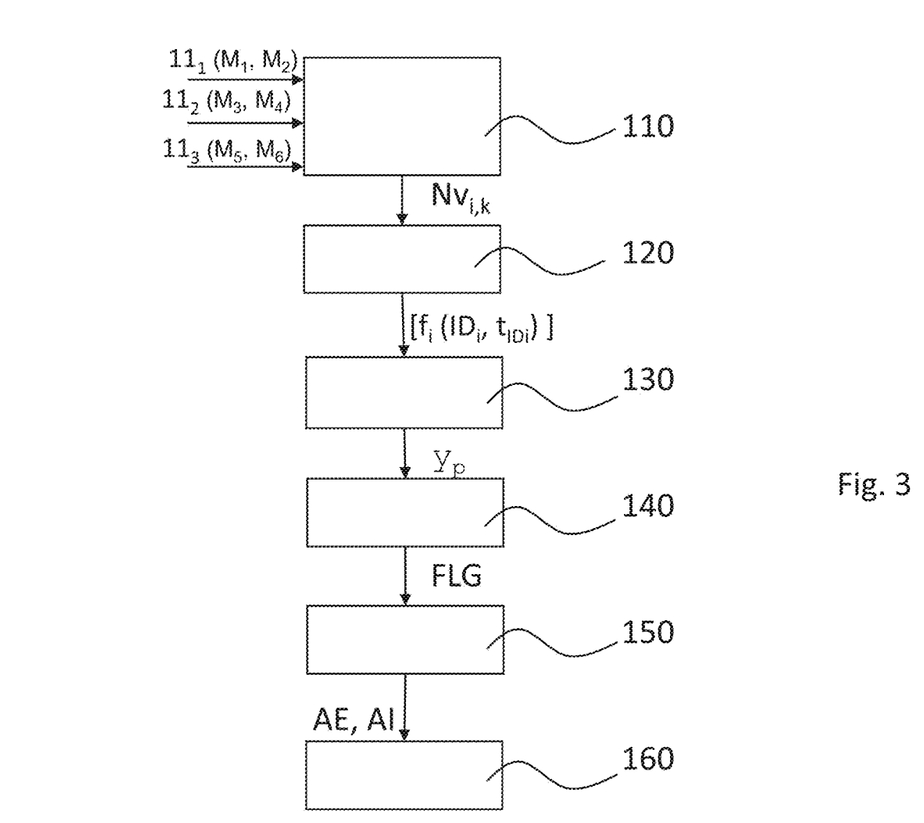
FIG. 3 illustrates a general diagram of the method described herein.

Represented schematically in FIG. 3 is the method for protection from cyber attacks in a vehicle communication CAN (Controller Area Network) that comprises a CAN-bus and a plurality of nodes or ECUs associated to said CAN-bus, like the one represented in FIG. 1.

The above method, designated as a whole by the reference 100 comprises a first step 130 of building dominant measurements $Nv_{i,k}$ for each message identifier ID, acquiring a given number of dominant measurements, for example 150 dominant measurements.

Coming from the ECUs $11_1, \ldots, 11_3$ are messages $M_i$ with respective message identifiers $ID_i$ for example $M_1$, $M_2$ from $11_1$, $M_3$, $M_4$ from $11_2$, and $M_5$, $M_6$ from $11_3$.

Figure 4A:
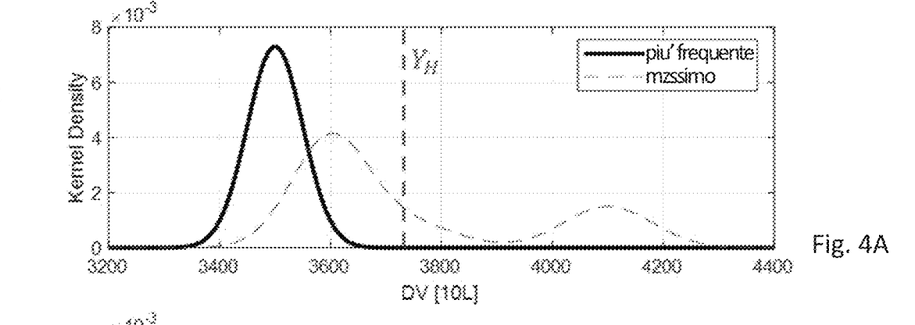
FIG. 4A and FIG. 4B show diagrams of quantities evaluated by the method described herein.
Figure 4B:
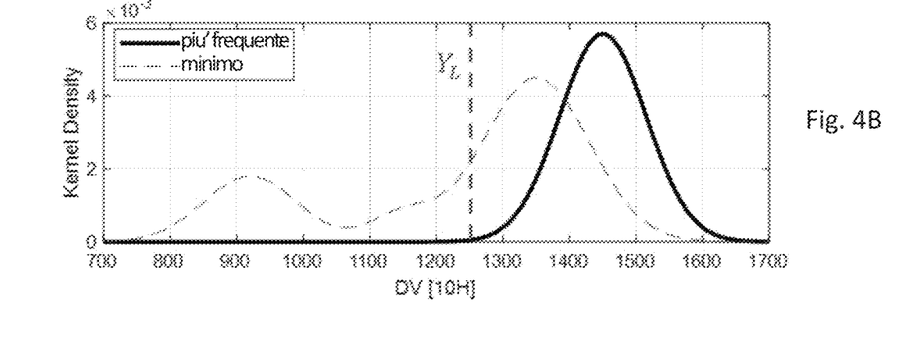
Figure 4C:
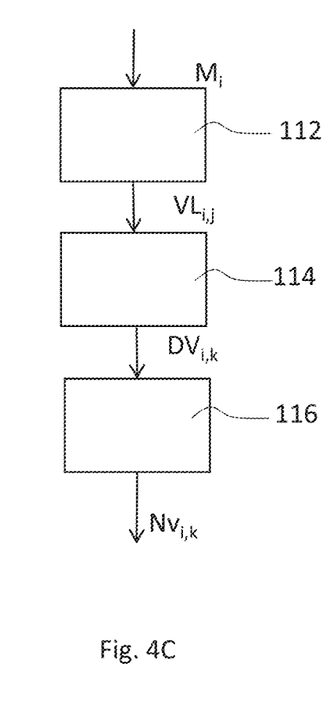
FIG. 4C shows a flowchart that represents a first step of operation of the method.

Hence, also with reference to the flowchart of FIG. 4C, which details the operation 110, this operation 110 initially comprises a step of measuring 112 the voltages $VL_i$ on the high line CAN-high 10H and on the low line CAN-low 10L for a given message $M_i$. If i is the index of the message, j may denote the index of the voltage measurements in the sequence of measurements, which are hence more specifically $VL_{i,j}$, where j is an integer that ranges from 1 to J.

Then, a filtering operation 114 is envisaged for filtering the voltage measurements of the message $VL_i$ to obtain measurements $DV_i$, that correspond to just the dominant bits of the message.

In this context, there are discarded all the measurements $VL_{i,j}$ lower than an upper threshold, in the example 2.75 V, on the high bus line CAN-high 10H and higher than a lower threshold, in the example 2.25 V, on the low bus line CAN-low 10L, in order to obtain a set of just dominant measurements $DV_{i,k}$, where k is an integer that ranges from 1 to K and is smaller than or equal to J, for a given message $M_i$. The operation of voltage measurement proceeds until the message $M_i$ is received completely and is represented in the buffer of the transceiver 12, where, by reading the respective identifier $ID_i$ of the message $M_i$, it is possible to determine to which message the aforesaid dominant voltage measurements $DV_{i,k}$ belong and to associate them to the aforesaid respective identifier $ID_i$.

Since, however, it may happen that a number of ECUs 11 communicate simultaneously, for example in the arbitration stage or during the ACK bit, it is useful to manage to discard the measurements that do not identify the legitimate ECU.

Hence, the filtering operation 114 may additionally comprise a procedure 116 of elimination of the measurements corresponding to the ACK bit. This is obtained by setting an upper threshold $\gamma_H$ above which the measurements on the bus line CAN-high 10H are discarded and a lower threshold $\gamma_L$ below which the measurements on the low bus line CAN-low 10L are discarded. These thresholds are characteristic of each ECU 11 and are created in the first step 130 of the method.

For instance, in order to define the above thresholds, given the distribution of the measurements values, specifically of the dominant voltage values $DV_{i,k}$, for the high bus line CAN-high 10H, the kernel density is calculated, and the upper discarding threshold $\gamma_H$ is set where the kernel density of the distribution of the most frequent values goes to zero, as represented in the diagram of FIG. 4A, which shows the kernel density of the dominant voltage values $DV_{i,k}$ for the most frequent values (solid line) and for the maximum values (dashed line) on the CAN-high 10H. For the CAN-low 10L the kernel density is calculated, and the lower discarding threshold $\gamma_L$ is set where the kernel density of the distribution of the most frequent values goes to zero, as represented in the diagram of FIG. 4B, which shows the kernel density of the dominant voltage values $DV_{i,k}$ for the most frequent values (solid line) and for the minimum values (dashed line) on the CAN-low 10L.

For the acknowledgement bits ACK, which are rewritten after the message has been received with dominant bits, higher voltages, e.g., VH of approximately 4 V and VL of approximately 0.5 V, are measured so that they fall outside the discarding thresholds. The different voltage level for the ACK is due to the fact that during the ACK slot all the nodes except for the transmitting one carry out acknowledgement, transmitting a dominant bit and switching on their own MOSFETs in parallel. This leads to a reduction in the resistances between VCC-10H and 10L-GND, with consequent reduction of the corresponding voltage drop. Hence, the voltages measured during reception of ACK are respectively higher and lower than the ones corresponding to the non-ACK dominant bits, and can be discriminated using the procedure of definition of thresholds based upon the distribution of the most frequent values.

Hence, via said operation only the following values are considered:

$$2.75V < DV < \gamma_H$$

$$\gamma_L < DV < 2.25V$$

In other words, in general, it is envisaged, in the operation 110, to measure the voltages on the bus lines and exclude the values associated to the recessive bits and to the acknowledgement bits ACK. These values correspond to non-ACK dominant voltage measurements $NV_{i,k}$ for the message $M_i$, where the index k ranges from 1 to NK, which is smaller than or equal to the integer K. Such an operation of elimination of the measurements corresponding to the ACK bit 116 hence comprises fixing for the high bus line and the low bus line respective lower and upper thresholds for the recessive bits, and respective upper and lower thresholds for eliminating the acknowledgement bits ACK.

The non-ACK dominant voltage measurements $NV_{i,k}$, in a subsequent, feature-extraction, operation 120, are then stored in respective sets $SM_i$ of non-ACK dominant voltage measurements $NV_{i,k}$ for each message identifier $ID_i$ and used for obtaining statistical features on the basis of the data in the sets $SM_i$ of non-ACK dominant voltage measurements $NV_{i,k}$, thus characterizing the physical behaviour of the ECU 11 from which they come.

Hence, after the operation 110, an operation 120 is carried out of extraction of statistical features $f_i$ from the sets $SM_i$.

Starting from the voltage levels of the non-ACK dominant voltage measurements $NV_{i,k}$ for each message identifier $ID_i$, both on the CAN-high and on the CAN-low for each message identifier $ID_i$, the following statistical features are, in particular, calculated, as summarized in Table 2, which provides the name of the feature and the equation for calculating it as a function of voltage levels of the] non-ACK dominant voltage measurements $NV_{i,k}$:

TABLE 2

| Name of feature | Equation |
| --- | --- |
| Maximum | $M = \max(NV_{i,k})$ |
| Minimum | $m = \min(NV_{i,k})$ |
| Mean | $\mu = \frac{1}{K}\sum_{k=1}^{K} NVi,k$ |
| Standard deviation | $\sigma = \sqrt{\frac{1}{K-1}\sum_{k=1}^{K}(NVi,k - \mu)^2}$ |
| Skewness | $s = \frac{1}{K}\sum_{k=1}^{K}\left(\frac{NVi,k-\mu}{\sigma}\right)^3$ |
| Kurtosis | $c = \frac{1}{K}\sum_{k=1}^{K}\left(\frac{NVi,k-\mu}{\sigma}\right)^4 - 3$ |

Hence, six statistical features or parameters of the set $SM_i$ of non-ACK dominant voltage measurements $NV_{i,k}$ are preferably calculated as features $f_i$, for each message identifier $ID_i$, namely, the maximum value M of the set $SM_i$ of non-ACK dominant voltage measurements $NV_{i,k}$, the minimum value m of the set $SM_i$, the mean $\mu$, the standard deviation $\sigma$, the skewness or asymmetry s, and the kurtosis.

The above statistical features $f_i$, which comprise parameters M, m, $\mu$, $\sigma$, s, c are calculated, as has been said, both on the voltage values of CAN-high 10H and on the voltage values of CAN-low 10L, and not on the difference signal. The aforesaid features $f_i$ are selected for obtaining low complexity and low dimensionality in the calculation in order to be able to operate in real time, and hence be able to implement the method described herein on an embedded system located on a vehicle as system of defence from cyber attacks.

In variant embodiments, it is possible to use else a subset of the aforesaid features $f_i$. For instance, it is possible to use just the six features corresponding the voltage values of CAN-high 10H, or else just one set of features that comprises only the maximum M and the minimum m of the voltage values of CAN-high 10H and the maximum M and the minimum m of the voltage values of CAN-low 10L. In variant embodiments, the set of features $f_i$ or the aforesaid subset may comprise other statistical features different from the ones appearing in Table 2.

It should moreover be noted that the solution described herein may comprise, in variant embodiments, inclusion in the dataset also of other parameters or values, in addition to the features $f_i$, for example regarding the conditions of measurement, for instance, values of temperature of the nodes and/or of the instrumentation, and/or of the vehicle.

Whenever, for one and the same message M, distinguished by a message identifier $ID_i$, the fixed number of voltage values has been collected on each of the buses 10H, 10L, the statistical features $f_i$, i.e., M, m, $\mu$, $\sigma$, s, c are then calculated. Then, preferably, for the purposes of the machine-learning procedure, the statistical features $f_i$, i.e., M, m, $\mu$, $\sigma$, s, c, are normalized. For instance, the normalization methodology adopted is Min-Max.

If $f_{i,1}$ is a generic statistical feature measured in the training or inference stage—where 1 is the index of the characteristics in a dataset for a given message index 1, for example $f_{1,1}$ is the maximum M of the first message on the high line 10H, $f_{2,2}$, the minimum m of the second message on the high line 10H, $f_{1,7}$ is the maximum M of the first message on the low line 10L, and 1=1, . . . , L, where in the example L=12, in so far as there are six characteristics M, m, $\mu$, $\sigma$, s, c for the high line 10H, and as many for the low line 10L—and if $f_{i,1,1}, \ldots, f_{i,1,T}$ is the set of the values of the features $f_{i,1}$ obtained during training on the entire set of data and if $A_{i,1}=\min(f_{i,1,1}, \ldots, f_{i,1,T})$ and $B_{i,1}=\max(f_{i,1,1}, \ldots, f_{i,1,T})$, where T is the set of the values of the features $f_{1,1}$ obtained during training on the entire set of data, normalization envisages calculating normalized values $f^*_{i,1}$ according to the relation Min-Max:

$$f^*_{i,1}=(f_{i,1}-A_{i,1})/(B_{i,1}-A_{i,1})$$

The minimum value $A_{i,1}$ and the maximum value $B_{i,1}$ of each statistical feature $f_{i,1}$ may hence in some embodiments be calculated during training on the entire dataset to obtain, respectively, the aforesaid values $A_{i,1}$ and $B_{i,1}$. In the inference stage, the values of $A_{i,1}$ and $B_{i,1}$ are used to normalize the features $f_{i,1}$ to obtain the normalized features $f^*_{i,1}$.

In this type of normalization, the entire set of statistical features $f_{i,1}$ for the different message identifiers $ID_i$, is re-sized over a fixed interval, in general from 0 to 1. It is advisable to adopt this approach when the distribution of the data is not known and when the distribution of the data is certainly non-Gaussian.

In any case, in what follows also the normalized features are denoted for simplicity of representation by $f_{i,1}$, instead of by $f^*_{i,1}$, irrespective of whether they have been normalized or not.

Then, in a step 130, the statistical features $f_1$ for each message identifier $ID_i$ that are available at each instant $t_{IDi}$ are supplied at input to a neural network of a pattern-recognition type. This is namely a neural network that operates with supervised learning in which the neural network must be able to categorize the data in a number of classes. Supervised learning is a type of automatic learning, in which supplied to the network are example inputs and the corresponding desired outputs, with the purpose of learning a general rule that is able to map the inputs into the outputs.

Figure 5:
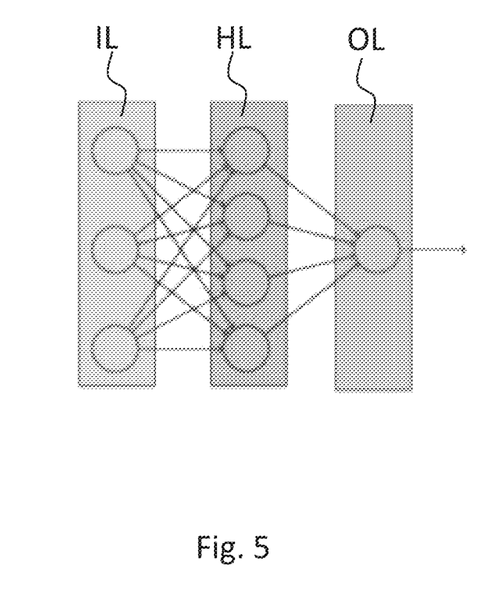
FIG. 5 is a schematic illustration of an example of layer of neural network used by the method described herein.

From an architectural standpoint, the neural network of step 130 is illustrated in FIG. 5, designated as a whole by 30, and is, in the example, a network of a feed-forward type, in which the flow of information travels in a single direction without the presence of loops or cycles.

As emerges from FIG. 5, the aforesaid neural network 30 comprises a layer of input neurons IL, which is coupled to a hidden layer HL, downstream of which an output layer OL is provided. The above neural network 30 does not comprise connections between neurons that belong to one and the same layer, but only between neurons belonging to subsequent layer, i.e., the hidden layer HL. In particular, preferably the neural network implemented is characterized by just one hidden layer with a fixed number of neurons.

The neural network 30 must be able to recognize the ECUs 11 that communicate on the bus, thanks to a dataset of statistical features $f_i$ at input. A dataset of statistical features $f_i$ comprises a set of features $f_i$ for a respective message identifier $ID_i$. The neural network 30 in the training stage has been trained by receiving datasets of statistical features $f_i$ corresponding to all the receivable message identifiers $ID_i$, where the index i ranges from 1 to N, which is number of messages to be analysed. The output of the neural network 30 represents a membership class, i.e., a number from 1 to n, where n is the maximum number of ECUs 11 belonging to the network, i.e., communicating on the bus.

Figure 6A:
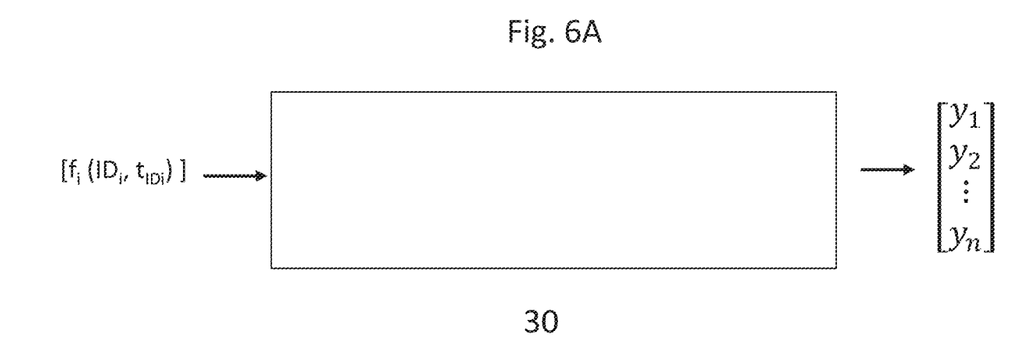
FIG. 6A and FIG. 6B are schematic illustrations of a neural network of a system operating according to the method described herein.
Figure 6B:
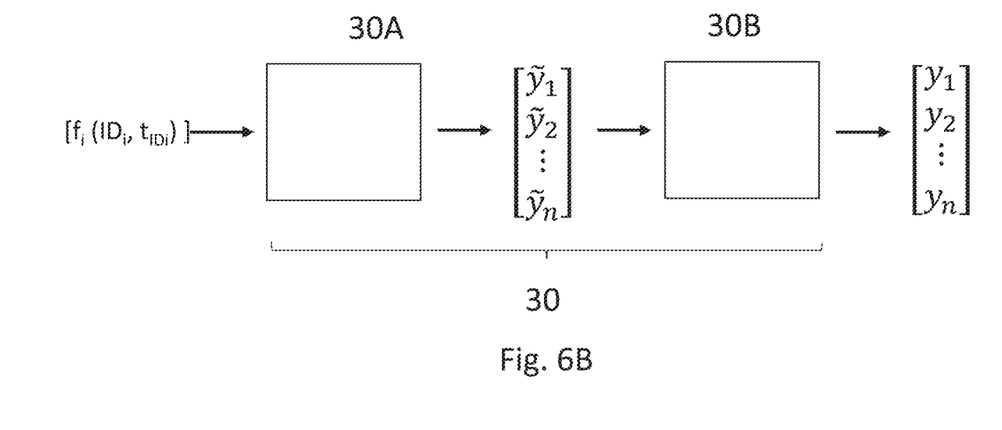

Illustrated in FIG. 6A is the neural network 30 that in step 130 receives a dataset [$f_i$ ($ID_i$, $t_{IDi}$)]—i.e., the dataset comprises the set of statistical features $f_i$, calculated in step 120 for a given message identifier $ID_i$ and at a given instant $t_{IDi}$—for carrying out an operation 140 of classification, or pattern recognition, supplying n prediction values $y_1, \ldots, y_n$ that represent respective membership scores for the dataset [$f_i$ ($ID_i$, $t_{IDi}$)] at input with respect to each class corresponding to a given ECU $11_1, \ldots, 11_n$, i.e., n values between 0 and 1 that indicate the membership score of the message identifier $ID_i$, to which the dataset [$f_i$ ($ID_i$, $t_{IDi}$)] corresponds, which contains in the example the twelve values of statistical features, with respect to each of the n classes. In FIG. 6B it is indicated that the neural network 30 preferably comprises a neural network 30A with a set of layers that implement a feed-forward network, which yields a value $\tilde{y}_1, \ldots, \tilde{y}_n$ for each class weighted by the neural feed-forward network 30A, while the score vector $y_1, \ldots, y_n$, which comprises confidence values, i.e., probability scores, is obtained by subsequently applying a layer of a Softmax type 30B. It should be noted that the instant $t_{IDi}$ may not form part of the dataset at input during inference; i.e., the input is only [$f_i$ ($ID_i$)] in so far as the aforesaid instant $t_{IDi}$ may be used only during the testing stage in order to evaluate the latency of identification of an invalid message.

Given the n outputs $y_1, \ldots, y_n$ it is then envisaged in an anomaly-detection step 150 to evaluate whether the output $y_p$ with the highest score of a membership threshold, for example 75%, determined by the neural network 30, corresponding to a certain predicted ECU $11_p$, where p is one of the values from 1 to n, for a certain dataset [$f_i$ ($ID_i$, $t_{IDi}$)] at input, allows, as admissible message identifier $ID_a$, the current identifier $ID_i$, i.e., the identifier $ID_i$ at input. This evaluation is made by accessing the DBC (DataBase CAN) file of the CAN-bus 10, which contains information on the names of the ECUs 11 and the list of their admissible message identifiers $ID_a$. For each ECU 11, from $11_1$ to $11_n$, all the legitimate message identifiers $ID_a$ are thus known. Hence, the DBC file is accessed with the predicted output $y_p$, or the predicted ECU $11_p$ as input, and in response the corresponding admissible message identifiers $ID_a$ stored in the DBC file for the predicted ECU $11_p$ are obtained. Then, a check is made to see whether the ECU $11_p$ predicted by the network 30 can effectively have as admissible legitimate message identifier $ID_a$ the current identifier $ID_i$. If the ECU $11_p$ predicted by the network 30 can effectively have as admissible legitimate message identifier $ID_a$ the current identifier, then in step 150 it is concluded that there is no anomaly. This evaluation of step 150 can be stored in a variable FLG of a vector type with a given logic value, for example a logic zero. This means that the neural network 30 has recognized the features $f_i$ of that given message identifier $ID_i$ as effectively belonging to the legitimate ECU. Instead, if the predicted output $y_p$ corresponding to the ECU $11_p$ does not comprise among its admissible message identifiers $ID_a$ the current message identifier $ID_i$, then an anomaly is present. This can be stored in the variable FLG with the negated logic value, for example a logic one.

Since the neural network 30 can make classification errors, or misclassifications, in order to be able to recognize a misclassification from an alarm due to a malicious message, or more in general an attack, there is then envisaged an attack-recognition procedure 160.

The above procedure can use the following vectors, i.e., vector variables, stored, for example, in a corresponding memory register, for each message identifier $ID_i$, of pre-set length m:

flag-anomaly vector FLG: as has been said, in this vector of length m logic values are written, for example 0 and 1, in step 150; the logic value 0 indicates the absence of anomalies in so far as the neural network 30 has predicted correctly the membership class of the features $f_i$ corresponding to the message identifier $ID_i$; the logic value 1, instead, indicates an anomaly in so far as the network 30 has made a false prediction;

class-storage vector NN: this stores the class $y_p$ predicted by the network 30 both if the classification is correct and if it is not correct; and confidence vector ACC: this saves the confidence value of the prediction, i.e., the score of membership to the class $y_p$, which is identified as the class with the highest confidence value.

The procedure described here may moreover comprise a time vector TM: this stores the current time $t_{pi}$ at which the prediction is made. In this regard, $t_{IDi}$ is the instant at which the message identifier $ID_i$ has been received. For signalling an anomaly, as explained also in what follows, it is necessary to gather a set of misclassifications of the message identifier $ID_i$ which hence correspond to a number of instants $t_{IDi}$. In this context, the current time $t_{pi}$ at which the prediction is made can be defined as $t_{IDi}$ of the last misclassified identifier. In a variant embodiment, the current time $t_{pi}$ may correspond to the instant at which the method described detects an anomaly, which in general is subsequent to the last $t_{IDi}$ of misclassified identifier. For the purposes of the method, during a normal step, i.e., an inference step, not a training step, this value of current time $t_{pi}$ is not used; it has the function of providing information on when the attack has occurred, for example, during the training step.

Figure 7:
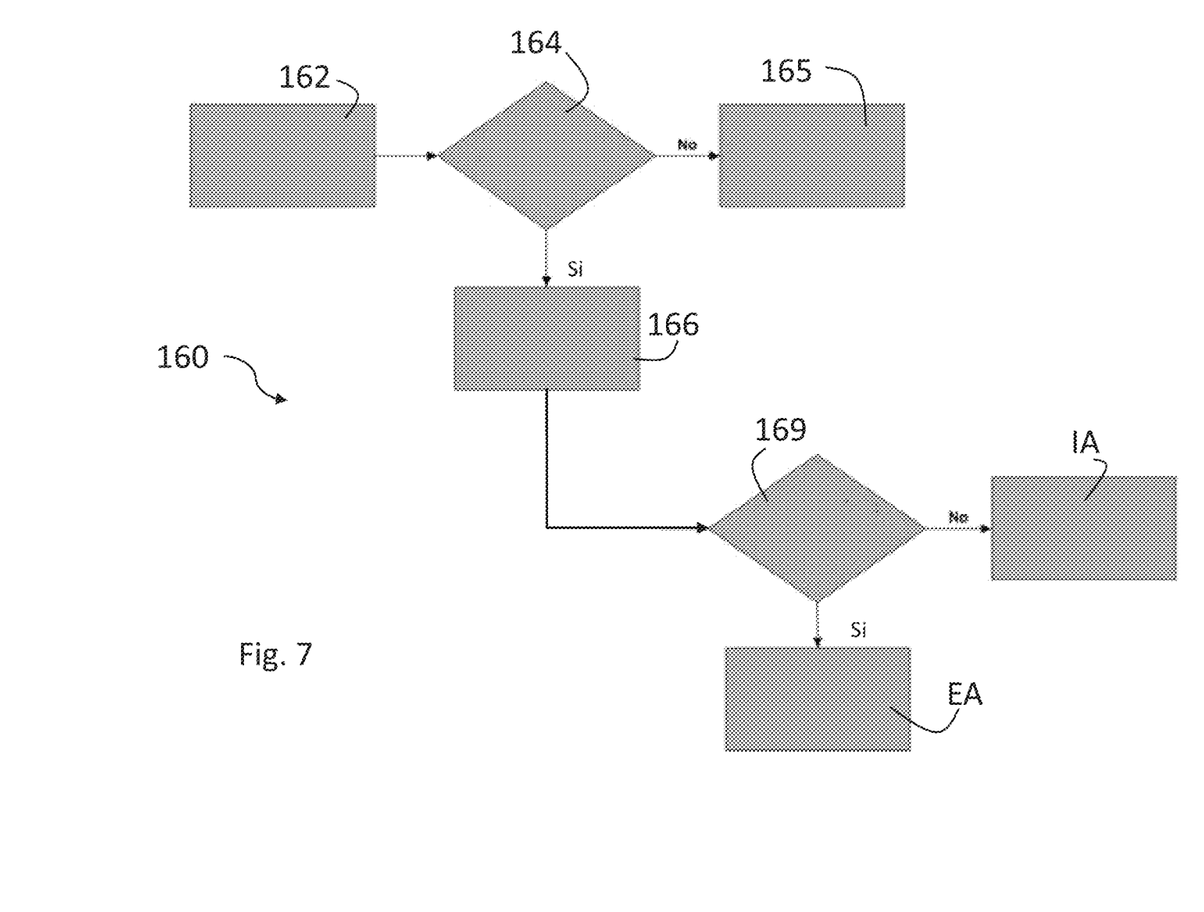
FIG. 7 shows a flowchart that represents schematically a further step of the method described herein.

As illustrated in FIG. 7, the procedure 160 envisages a step 162 of verifying the number of consecutive logic is in the vector FLG, i.e., of values indicating anomalies, for a given message identifier $ID_i$ that has been classified by the network 30. If there are m consecutive logic 1s, this means that for m times the neural network 30 has made a false prediction of the membership class of the features $f_i$, of the corresponding message identifier $ID_i$. The choice of the length m has to be made taking into account that a smaller length could lead to an alarm for message identifiers that have not actually been compromised, but rather they are really errors of the neural network 30. A greater length could, instead, affect the performance of recognition of an attack in so far as there could be a sort of delay in the prediction of the corrupt features. In the example described herein, the length m is 20.

Hence, in step 162 compromised message identifiers $ID_i$ may be indicated if there are m consecutive 1s in the flag-anomaly vector FLG.

Then, in a step 164 operations are carried out to understand from which device, an internal ECU or an external device, the attack comes. In the training stage, the neural network classifies a number N of ECUs 11 that communicate within the bus. Hence, in the training stage there is no knowledge of the external device. There thus arises the need to understand how to be able to classify an attack as external given that the neural network 30, on account of the way in which it is trained, has no information about the external device.

Hence, when in step 162 an attack is signalled because there are m consecutive 1s in the flag-anomaly vector FLG, in a step 164 an evaluation is made of the value stored in the confidence vector ACC regarding the prediction that has generated flagging of an attack. Only the accuracies of less than 75% are considered so as not to confuse a misclassification with a clear prediction error. Consequently, in step 164, if it is evaluated that the accuracy of the prediction of the class is less than 75%, in a step 166 the corresponding class is saved, for example in a saved-class vector, for the subsequent evaluation in order to identify the ECU from which the attack comes. Otherwise, the class is discarded in a step 165. It may happen that, within the saved-class vector, one and the same class repeats. The classes saved in step 166 are the ones associated to which is an accuracy of less than 75%. For the overall calculation of the accuracy of each class from which the attack comes the mean accuracy is, for example, directly calculated in so far as one and the same class saved may repeat a number of times.

Then, in a step 169 a check is made to see how many different classes have been stored in step 166. If, for one and the same corrupted message identifier $ID_i$, i.e., with m 1s associated to the message identifier $ID_i$, the neural network 30 generates as prediction output one and the same membership class, it may be concluded that an internal attack is in progress (state IA). This means that the features of the malicious message will be classified as belonging to an ECU that is illicit but internal to the network, i.e., an ECU 11 communicating on the CAN-bus 10. Otherwise, if for one and the same message identifier $ID_i$, whether corrupted or malicious, the neural network 30 generates as output a number of membership classes, then it is possible to classify the attack as external (state EA). In this case, the features with the same message identifier $ID_i$ are interpreted as belonging to a number of illicit ECUs 11 internal to the CAN-bus 10.

The anomaly-detection procedure 160, in addition to classifying the attack between internal and external attacks, may optionally envisage, during the testing stage, providing, for each corrupted message identifier $ID_i$, times of start tb and end tf of the attack so as to be able to compare them with the true times known beforehand at which the attack effectively takes place. The time of start of attack tb is the time at which, for the first time, for a message identifier $ID_i$, m consecutive is have been collected within the vector FLG. The time of end of attack tf is the time at which, for the last time, m consecutive 1s are stored in the vector FLG. Consequently, the duration of the attack is nothing other than a temporal difference between the time of end of attack and the time of start of attack.

Thus, the protection method from cyber attacks here described substantially corresponds to a procedure of monitoring the messages exchanged among the network nodes carrying out an anomaly-detection operation, e.g. 150, and carrying out an operation, e.g. 160, for recognition of attacks. Tracking the source of malicious messages is indeed a protection procedure in itself as the above anomaly detection and attack recognition operations have outputs which may already interpreted as alarms or alert in themselves. Also, the protection method may include specific alarm, as after step 169. Also other form of measures against the attacks can be used, corresponding to the identified attack, as mentioned such measures may include one or more of forensic, isolation, security patch operations.

There is now described the stage of training the neural network 30.

The above training stage corresponds substantially to step 130; i.e., the neural network 30 receives datasets $[ID_i, f_i, t_{Idi}]$, namely, the dataset for different values of i that comprises the message identifier $ID_i$, the set of statistical features $f_i$ calculated via step 120 at a given instant $t_{IDi}$ for the message identifier $ID_i$, and said given instant $t_{Idi}$, for carrying out an operation 140 of classification or pattern recognition, to supply a prediction $y_p$ of a membership class corresponding to a given ECU $11_1, \ldots, 11_n$.

Of course, since it is a training stage, together with the dataset $[f_i(ID_i, t_{IDi})]$ the respective desired outputs for each dataset, i.e., the ECUs 11, are supplied.

In the training step, the task of the neural network is to classify the input dataset $f_i$, in a number of classes, representing the ECUs that communicate on the bus. Ideally, the aim would be to obtain a balanced dataset, i.e., a dataset in which each ECU communicates in the same way with the same periodicity. In this way, there is a dataset of features, for each ECU, that is more or less of the same size. In actual fact, not always do the ECUs communicate with the same periodicity, but it is important that for each ECU there should be a significant dataset of features so as to have good learning capabilities for the network itself. In the training stage, it is not important to order the messages in time in so far as there is no need to use the neural network 30 in real time. The neural network is not expected to make a prediction upon arrival of a message.

Given that the DBC file is known beforehand and represents a sort of true map that correlates, for each ECU 11 of interest, the number of legitimate message identifiers ID, it is possible, for each ECU 11, to compact in a single matrix the various features corresponding to each legitimate identifier. In this way, the desired, or target, output supplied at input in a supervised learning session represents precisely the ECU to which the features of its legitimate message identifiers ID are associated. Moreover, it is expedient to process acquisitions that are made in the same operating conditions. In the implementation stage, it has been noted how a change of temperature can affect the learning performance. To obtain a rich dataset, in the design stage, it is possible, for example, to combine a number of acquisitions with similar characteristics, such as temperature.

The neural network 30 is configured to obtain a real output that is as close as possible to the desired output, supplied at input. In mathematical terms, this is equivalent to minimizing the error between the predicted output and the true output, optimizing the weights of the connections. For instance, back-propagation algorithms seek the directions opposite to the gradient to minimize the error. It is also possible to use second-order minimization techniques, which enable a faster convergence. The latter are generally applied to medium-sized to small-sized networks. In the example described herein, the algorithm used by the neural network 30 is the scaled-conjugate-gradient back-propagation algorithm. This is a second-order algorithm, where minimization of the error is performed in the conjugate directions. Moreover, this algorithm makes it possible to obtain a low computational cost in so far as it requires a memory proportional to O(KP), where KP is the number of the weights characterizing the network.

Whenever training is carried out, it is good practice to divide the input dataset into three parts: training, testing, and validation. The training set represents the set of the data from which the network will be able to learn. The testing set is characterized by data not present in the training set in so far as the aim of the testing set is to test the learning capabilities of the network with data that it has not seen in the training stage. Finally, the validation set has the purpose of optimising the hyperparameters, such as the number of neurons or the type of loss function.

During the testing stage, it is envisaged to supply at input to the network 30 a dataset in which the attack is present. The neural network 30 must be able to identify the compromised features, the nature of the attack (whether internal or external), and the times of start and end of attack. For this purpose, it is possible to use the steps 150, 160 already described.

During the testing stage, for example, all the acquisitions in which the attack is present come from the same setup: the attack is conducted by an external device, and from a certain point onwards transmission of a given message identifier $ID_i$ internal to the network is suspended. A suspension attack is hence taking place in so far as communication of an identifier $ID_i$ is suspended from a certain instant onwards. Since the intention is to use the neural network previously trained with datasets that are not under attack, it is expedient to process the acquisitions with attack in the same way as the ones used in the training stage.

Consequently, also during the testing stage the features $f_i$ of each message identifier are calculated awaiting a fixed number of dominant values in so far as the voltage-threshold-learning methodology described previously (step 110) is applied.

During the testing stage, the temporal order is important in so far as the aim is to operate in real time as occurs during normal operation. At each instant, as in step 140, there is a vector of features $f_i$ of size [1×12], i.e., six for the low line and six for the high line, and the corresponding identifier $ID_i$ (the message identifier $ID_i$ constitutes intrinsic information of the CAN packet). At each instant, the neural network 30 (trained off-line) makes a prediction; i.e., it yields as output a score of membership to the classes, i.e., n values between 0 and 1, where n is the maximum number of ECUs that communicate internally on the bus.

The solution described herein also regards a device for protection from cyber attacks in a vehicle communication CAN (Controller Area Network) 20 that comprises a CAN-bus 10 and a plurality of nodes 11 associated to said CAN-bus 10 in a signal-exchange relationship and associated at least in part to control units for controlling functions of the vehicle, in which the device is configured for operating according to the method described herein.

The aforesaid protection device may be comprised in an ECU 11, for example in the microcontroller 14, which can implement the neural network 30 and the software or hardware modules configured for executing the operations according to the method. The protection device may even, however, be an additional device connected on the network 20.

Hence, from what has been described above, the advantages of the solution proposed emerge clearly.

The solution described via the steps of anomaly detection and attack identification renders the neural network a reactive tool in so far as, in addition to recognizing exactly the corrupted features, it is able to classify the nature of the attack between internal and external.

The solution described based upon machine-learning notions is a valid tool for classification of the ECUs internal to an in-vehicle network, i.e., for example the CAN. The architecture of the neural network is suited to being of small dimensions so as to guarantee porting on an embedded system. From a computational standpoint, neural networks are generally expensive. In this case, since the architecture is simple and is characterized by just one hidden layer and does not have a dataset of images but a dataset of features, complexity is reduced.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A method for protection from cyber attacks in a communication network including a Controller Area Network (CAN)-bus, comprising a high bus line, on which high logic voltages pass, and a low bus line, on which low logic voltages pass, and a plurality of nodes associated to said CAN-bus in a signal-exchange relationship and associated at least in part to control units for controlling functions of the vehicle, said nodes exchanging messages passing between nodes of said plurality of nodes to identify illicit messages, said messages being coded in data frames through dominant and recessive bits, said method comprising the steps of:

building sets of dominant voltage measurements for each message identifier associated to a message that is passing;

extracting statistical features, in particular features accumulated in respective sets of dominant voltage measurements for each message identifier;

supplying the statistical features for each message identifier that are available at each instant at input to a neural network of a pattern-recognition type;

carrying out an operation of classification, or pattern recognition, supplying a prediction of a membership class corresponding to a given node on the basis of at least said statistical features supplied at input;

carrying out an anomaly-detection operation that comprises evaluating whether said prediction supplied by a neural network corresponds to a given node that allows as admissible message identifier the message identifier at input and, if it does not, signalling an anomaly for said message identifier; and carrying out an operation for recognition of attacks, which comprises evaluating whether a number of anomalies signalled for said message identifier exceeds a given threshold.

2. The method as set forth in claim 1, wherein said operation for recognition of attacks comprises evaluating whether the accuracy of the predictions that determine said number of anomalies signalled for said message identifier that exceeds a given threshold is lower than a pre-set value of accuracy and, if so, storing the classes corresponding to the predictions and evaluating whether there are at least two different classes stored and, if there are, sounding an alarm signalling an attack external to the CAN, and if there are not, sounding an alarm signalling an attack internal to the CAN.

3. The method as set forth in claim 1, wherein said step of extracting statistical features comprises calculating one or more from among a maximum value of the set of dominant voltage measurements, a minimum value of the set, a mean, a standard deviation; a skewness, and a kurtosis.

4. The method as set forth in claim 1, wherein said step of building sets of dominant voltage measurements for each message identifier associated to a message that is passing comprises:
 measuring voltages on the high line and on the low line for a given message;
 filtering said message voltage measurements to obtain measurements corresponding to just the dominant bits of the message; and
 eliminating the measurements corresponding to an Acknowledge (ACK) bit.

5. The method as set forth in claim 1, wherein said neural network is a network of a feed-forward type, which in particular implements is trained via Scaled-Conjugate-Gradient Back-Propagation.

6. The method as set forth in claim 1, wherein said operation of supplying the statistical features for each message identifier that are available at each instant at input to a neural network of the pattern-recognition type comprises supplying datasets that comprise the message identifier, the corresponding set of statistical features calculated at a given instant for that message identifier, and in particular also said given instant.

7. The method as set forth in claim 1, wherein said carrying out an anomaly-detection operation comprising evaluating whether said prediction supplied by the neural network corresponds to a given node that allows as admissible message identifier said message identifier at input, comprises accessing a database of the communication network, in particular a DataBase CAN (DBC) file of the CAN-bus, stored in which are the admissible message identifiers for each node and obtaining the admissible message identifiers corresponding to said prediction, and then verifying whether the node predicted by the neural network comprises among its own legitimate admissible message identifiers the message identifier at input.

8. The method as set forth in claim 1, wherein, following said carrying out an anomaly-detection operation and carrying out an operation for recognition of attacks, taking corresponding protection measures.

9. A device for protection from cyber attacks in a communication CAN of a vehicle comprising a CAN-bus and a plurality of nodes associated to said CAN-bus in a signal-exchange relationship and associated at least in part to control units for controlling functions of the vehicle, said device being configured for operating according to the method of claim 1.

10. The protection device as set forth in claim 9, wherein said device is included in a control unit coupled to the network.

11. The protection device as set forth in claim 10, wherein said protection device is additional to the nodes of the network.

* * * * *